(12) United States Patent
Pidwerbesky

(10) Patent No.: US 11,917,936 B2
(45) Date of Patent: Mar. 5, 2024

(54) SUPPORT FOR AN AGITATOR OF AN AGRICULTURAL SYSTEM

(71) Applicant: CNH Industrial Canada, Ltd., Saskatoon (CA)

(72) Inventor: Jesse Blair Pidwerbesky, Warman (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 1164 days.

(21) Appl. No.: 16/665,789

(22) Filed: Oct. 28, 2019

(65) Prior Publication Data

US 2021/0121836 A1 Apr. 29, 2021

(51) Int. Cl.
| | | |
|---|---|---|
| A01C 15/00 | (2006.01) | |
| A01C 7/10 | (2006.01) | |
| B01F 35/41 | (2022.01) | |
| B01F 27/1145 | (2022.01) | |

(52) U.S. Cl.
CPC ............ A01C 15/007 (2013.01); A01C 7/102 (2013.01); B01F 35/413 (2022.01); B01F 27/1145 (2022.01)

(58) Field of Classification Search
None
See application file for complete search history.

(56) References Cited

U.S. PATENT DOCUMENTS

| | | | |
|---|---|---|---|
| 3,111,351 | A | 11/1963 | Tanke |
| 3,735,904 | A * | 5/1973 | Vissers ............... A01C 15/007 414/519 |
| 3,795,428 | A | 3/1974 | Paine et al. |
| 3,820,860 | A | 6/1974 | Stone |
| 4,017,127 | A | 4/1977 | Smith et al. |
| 4,173,262 | A | 11/1979 | Adee |
| 4,384,643 | A | 5/1983 | Cone |
| 4,704,038 | A | 11/1987 | Bruchon, Jr. |
| 4,993,850 | A | 2/1991 | Howse |
| 5,035,190 | A * | 7/1991 | Grimes .................... A01C 7/08 366/195 |
| 5,501,405 | A * | 3/1996 | Doornek .............. E01C 19/203 239/683 |
| 5,868,327 | A * | 2/1999 | Dawson .................. A01C 1/00 241/101.8 |
| 7,465,099 | B2 | 12/2008 | Connell et al. |
| 9,765,818 | B2 | 9/2017 | Astner et al. |
| 9,819,301 | B2 | 11/2017 | Ripoll Agullo |
| 10,294,632 | B2 | 5/2019 | Pascual et al. |
| 10,320,326 | B2 | 6/2019 | Schimelpfenig et al. |

(Continued)

FOREIGN PATENT DOCUMENTS

DE 102014109503 A1 1/2016
KR 20220043341 A * 4/2022

*Primary Examiner* — Joseph A Dillon, Jr.
(74) *Attorney, Agent, or Firm* — Rebecca L. Henkel; Rickard K. DeMille

(57) ABSTRACT

An agitating system of an agricultural system includes a brace configured to couple to a sub-hopper of the agricultural system and a support configured to engage the brace and to support a shaft within the sub-hopper. The support includes a support piece having a first portion configured to receive the shaft and the brace has a recess configured to receive the first portion of the support piece while the support is in an installed configuration.

19 Claims, 6 Drawing Sheets

(56) References Cited

U.S. PATENT DOCUMENTS

| | | |
|---|---|---|
| 11,618,638 B2 * | 4/2023 | Ruppert ................ B65G 65/46 209/254 |
| 2011/0220375 A1 | 9/2011 | Connell, Jr. et al. |
| 2015/0315759 A1 * | 11/2015 | Delorme .............. A01C 17/001 239/683 |
| 2017/0188506 A1 | 7/2017 | Steinlage et al. |
| 2018/0070530 A1 * | 3/2018 | Beal ..................... A01C 15/007 |

* cited by examiner

SUPPORT FOR AN AGITATOR OF AN AGRICULTURAL SYSTEM

BACKGROUND

The disclosure relates generally to a support for an agitator of an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are used to distribute particulate material, such as seeds, fertilizer, and/or other agricultural product, on or in an agricultural field using various methods. The agricultural seeding implement may be towed behind a work vehicle, such as a tractor. Certain embodiments of agricultural seeding implements include a storage tank in which the particulate material is stored and a metering system configured to meter the particulate material from the storage tank. The particulate material is distributed from the metering system to row units, which are configured to distribute the particulate material on or in the ground of the agricultural field.

As the storage tank is filled with the particulate material and/or while the particulate material flows from the storage tank to the metering system, the particulate material may form an undesirable profile within the storage tank. Several factors may contribute to this undesirable profile, including, but not limited to, friction between the particulate material and the storage tank, clumping of the particulate material, operation of the implement on a slope, and an inactive portion or inactive portions of the metering system. This undesirable profile may lead to uneven flow to the metering system, thereby causing an unwanted distribution or no distribution of the particulate material over and/or within certain regions of the agricultural field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agitating system of an agricultural system includes a brace configured to couple to a sub-hopper of the agricultural system and a support configured to engage the brace and to support a shaft within the sub-hopper. The support includes a support piece having a first portion configured to receive the shaft and the brace has a recess configured to receive the first portion of the support piece while the support is in an installed configuration.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
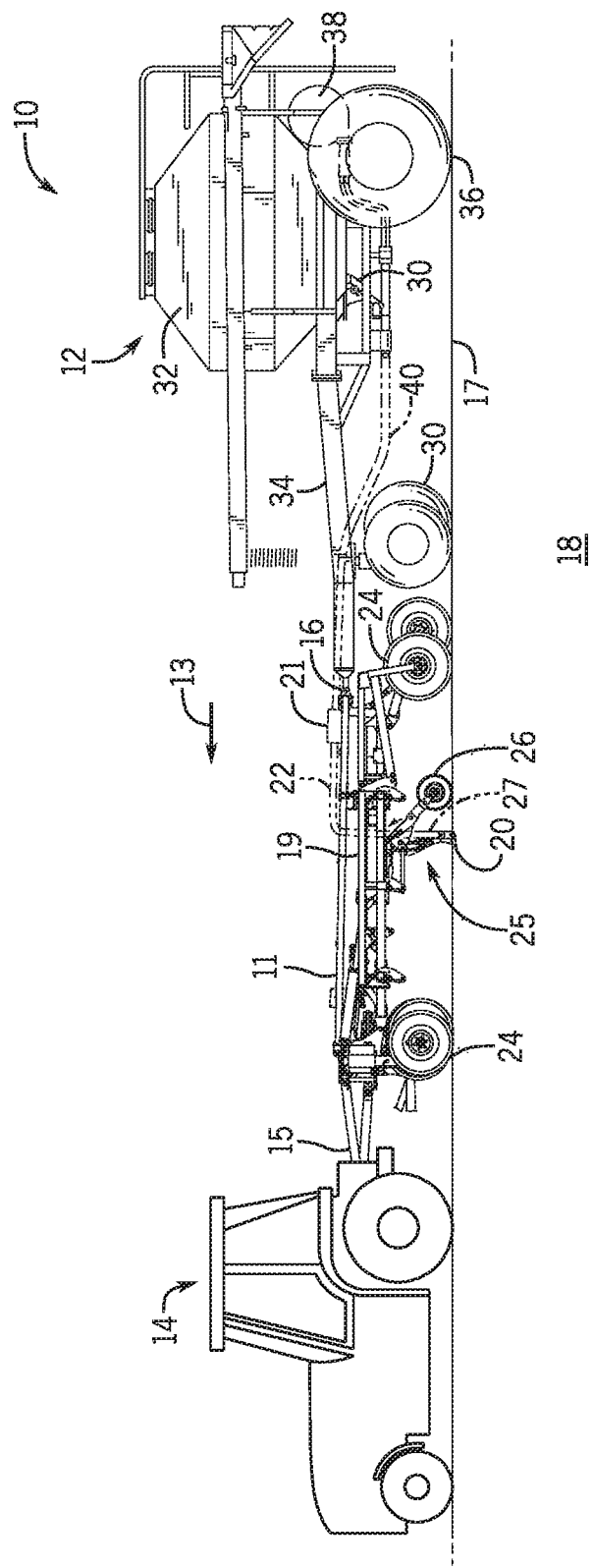
FIG. 1 is a side view of an embodiment of an agricultural system that includes an agricultural implement coupled to an air cart, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to agricultural systems having an agitator. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material throughout a field. The particulate material may flow from the storage tank through a metering system, which is configured to control the flow of the particulate material to the field. In certain circumstances, the profile of the particulate material within the storage tank may affect a manner in which the particulate material moves through the metering system. For example, the profile of the particulate material may cause a reduced amount of particulate material to flow through certain meters of the metering system.

As such, the agricultural system may include an agitating system configured to agitate the particulate material to break up clumping and/or adjust (e.g., level) the profile of the particulate material to enable the particulate material to flow through the metering system in a desirable manner. The agitating system may include a shaft configured to rotate during operation of the agitating system. For example, the shaft may be driven to rotate such that extensions coupled to the shaft move through the particulate material to agitate the particulate material. During operation of the agitating system, certain forces may be imparted onto the shaft, such as from a weight of the particulate material, from rotation of the shaft, and the like. Such forces may cause the shaft to flex undesirably (e.g., bend). Flexing of the shaft may reduce a performance of the agitating system, thereby resulting in an undesirable particulate material profile.

Thus, in accordance with the present disclosure, multiple supports may couple to the shaft to secure the shaft in a desired position and to reduce undesirable flexing of the shaft. For example, the supports may couple a certain section of the shaft to stationary braces within the agitating system. By reducing flexing of the shaft relative to the braces, the supports may increase the longevity of the shaft and improve the performance of the agitating system. In some embodiments, each support may include two pieces that are removably coupled to one another and to the shaft. As such, the support may be coupled to and decoupled from the shaft more easily than a single piece support, thereby reducing a time to manufacture the agitating system.

Turning now to the drawings, FIG. 1 is a side view of an embodiment of an agricultural system 10 that includes an agricultural implement 11 coupled to an air cart 12. In the depicted embodiment, the air cart 12 is towed behind the agricultural implement 11 relative to a direction of travel 13. In addition, the agricultural implement 11 is coupled to a work vehicle 14 (e.g., a tractor) by a first hitch system 15, and the air cart 12 is coupled to the agricultural implement 11 by a second hitch system 16. While the agricultural implement 11 is towed between the work vehicle 14 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled (e.g., autonomous) vehicle.

The agricultural implement 11 may be an agricultural seeding implement configured to deposit rows of particulate material (e.g., seeds) into soil of an agricultural field 18 as the agricultural implement 11 is towed across a surface 17 of the agricultural field 18 by the work vehicle 14. The agricultural implement 11 includes a tool frame 19, a row unit 20 (e.g., a ground engaging opener system) coupled to the tool frame 19, a distribution header 21, a hose 22, and wheel assemblies 24. The wheel assemblies 24 contact the surface 17 to enable the agricultural implement 11 to be towed by the work vehicle 14. As the agricultural implement 11 moves in the direction of travel 13, a row of particulate material may be deposited into the soil by the row unit 20. Although only one row unit 20 is shown, the agricultural implement 11 may include multiple row units organized in a row across a width of the agricultural implement. In some embodiments, the agricultural implement 11 may include a row of 12, 14, 16, 18, 20, or more row units 20, which may each deposit a respective row of particulate material into the soil. Additionally or alternatively, the agricultural implement 11 may include multiple rows of row units.

To facilitate depositing particular material, each row unit 20 includes an opener 25, a press wheel 26, a tube 27, and a hydraulic cylinder. When the opener 25 engages the soil, the opener 25 may exert a force that excavates a trench into the soil as the row unit 20 travels through the agricultural field 18. In the present embodiment, a vertical position of the press wheel 26 controls the depth of the opener 25, and the hydraulic cylinder controls the downward force (e.g., down pressure) applied by the press wheel 26. In addition, the opener 25 may be controlled to establish a target depth of the trench. The particulate material may then be deposited into the excavated trench via the tube 27. Then, the press wheel 26 may facilitate movement of the excavated soil into the trench to cover the particulate material and compress the soil covering the particulate material. In certain embodiments, the press wheel may not be a part of the row unit. Instead, for example, the press wheel may be mounted to the frame of the implement behind the row unit. Furthermore, while the illustrated row unit includes a ground engaging opener assembly, in alternative embodiments, at least one row unit on the implement may include an applicator assembly configured to deposit particulate material onto the surface of the agricultural field, or any other suitable type of product deposition assembly.

The air cart 12 may centrally store particulate material and distribute the particulate material to the row unit 20. Accordingly, the air cart 12 includes a particulate material agitating and metering system 30, a storage tank 32, an air cart frame 34, wheels 36, and an air source 38. In the depicted embodiment, the air cart frame 34 is coupled to the tool frame 19 via the second hitch system 16. The wheels 36 contact the surface 17 to enable the air cart 12 to be towed along with the agricultural implement 11. Additionally, the storage tank 32 may centrally store the particulate material for distribution. In some embodiments, the storage tank 32 may include multiple compartments for storing different types of particulate material. For example, a first compartment may store seeds while a second compartment may store a dry fertilizer. In such configurations, the air cart 12 may deliver both seeds and fertilizer to the agricultural implement 11 via separate distribution systems, or as a mixture through a single distribution system.

The particulate material agitating and metering system 30 may control the amount of particulate material distributed to the agricultural field 18. For example, the particulate material agitating and metering system 30 may be controlled to increase or decrease the amount of particulate material distributed to the agricultural field 18. As depicted, the particulate material agitating and metering system 30 is mounted to the bottom of the storage tank 32, which enables the storage tank 32 to supply particulate material to the particulate material agitating and metering system 30. The particulate material agitating and metering system 30 may then distribute the particulate material to the row unit 20 via a line 40 extending to the distribution header 21. The distribution header 21 may then distribute the particulate material to one or more row units 20 via the hose(s) 22. Some embodiments may include multiple distribution headers 21, with one or more row units 20 fluidly coupled to each distribution header 21 by hose(s) 22. In this manner, the particulate material agitating and metering system 30 may control distribution of particulate material from the storage tank 32 to the row units 20 and into the trenches.

Figure 2:
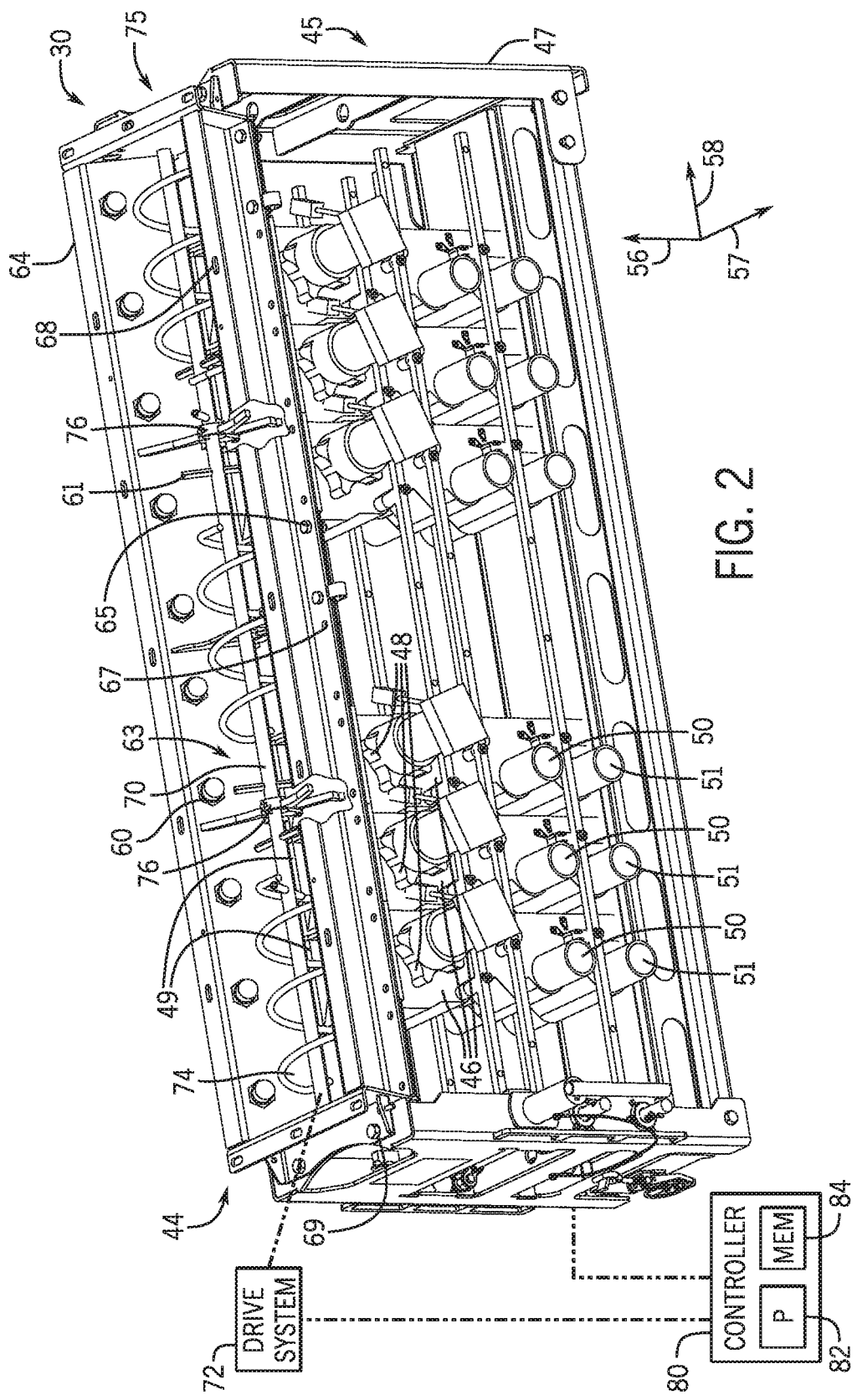
FIG. 2 is a perspective view of an embodiment of a particulate material agitating and metering system that may be employed within the air cart of FIG. 1, in which the particulate material agitating and metering system includes an agitation system.

FIG. 2 is a perspective view of an embodiment of a particulate material agitating and metering system 30 that may be employed within the air cart 12 of FIG. 1. The particulate material agitating and metering system 30 includes an agitating system 44 positioned above a metering system 45. As illustrated, the metering system 45 includes multiple seed meters 46 supported by a frame 47. The metering system 45 may include 1 to 10, or more than 10 (e.g., 15), seed meters 46. In the illustrated embodiment, each seed meter 46 includes at least one respective metering device 48 (e.g., meter roller) to control flow of particulate material to a respective conduit. Each seed meter 46 also includes an inlet 49 configured to receive the particulate material from the agitating system 44 (e.g., along a vertical axis 56). Furthermore, each seed meter 46 includes a first conduit connector 50 and a second conduit connector 51. Each conduit connector 50, 51 is configured to receive air flow from the air source and the particulate material from the metering device 48, thereby producing the air/material mixture. First primary conduits may be coupled to the first conduit connectors 50 and second primary conduits (e.g., lines 40) may be coupled to the second conduit connectors 51. Furthermore, the metering system 45 may include a gate that enables selection of the first conduit connector 50 or the second conduit connector 51. Once the first conduit connector 50 or the second conduit connector 51 is selected, particulate material flows through the selected conduit connector 50, 51. The primary conduits may be coupled to respective headers that provide particulate material to multiple row units.

A sub-hopper 64, which may be considered a part of the storage tank, is secured to the metering system 45 (e.g., to the frame 47 of the metering system 45) by fasteners 65 disposed through holes 67, 69 of the sub-hopper 64. First holes 67 are generally arranged along a length of the sub-hopper 64 along a longitudinal axis 58, and second holes 69 are generally arranged along a width of the sub-hopper 64 along a lateral axis 57. The sub-hopper 64 also includes third holes 68 configured to receive fasteners for securing the sub-hopper 64 to a structure of the storage tank or another portion of the agricultural system (e.g., the structure of a secondary storage tank, the structure of the air cart). Additionally or alternatively, the sub-hopper may be coupled to the frame of the metering system and the storage tank structure by other suitable connection(s), such as welds, tabs, and the like.

Generally, the particulate material may flow downwardly through the storage tank to the metering system 45 via the agitating system 44. That is, the particulate material may flow through the sub-hopper 64 into the inlets 49 of the seed meters 46. In some embodiments, the particulate material may pass through other features of the agricultural system (e.g., of the air cart) before entering the metering system 45.

In the illustrated embodiment, the agitating system 44 includes sensors 60. Certain embodiments may include 1, 2, 4, 6, 8, 10, 12, 14, or more sensors 60. Each of the sensors 60 is configured to detect a presence of particulate material at the location or position of the respective sensor 60. As such, the sensors 60 may determine a profile of particulate material disposed in the sub-hopper 64 and/or the storage tank before, during, and/or after operation of the agricultural system 8. A variety of sensor(s), such as ultrasonic sensor(s), electrostatic sensor(s), inductive sensor(s), capacitive sensor(s), Light Detection and Ranging (LIDAR) sensor(s), and/or other suitable sensor(s) may be used alone or in combination with one another to determine the profile of the particulate material. The sensor(s) may also include one or more cameras disposed in the sub-hopper 64 and/or storage tank, in which the camera(s) may be configured to detect the profile. As illustrated in FIG. 2, the sensors 60 are aligned in a row above an agitator 63 disposed within the sub-hopper 64. However, the sensors may be disposed in other suitable configurations/arrangements in the sub-hopper and/or storage tank, such as higher in the sub-hopper or above the sub-hopper (e.g., along the vertical axis 56). In further embodiments, sensors may be omitted from the particulate material agitating and metering system.

The agitator 63 of the agitating system 44 extends along the longitudinal axis 58 in an area below the sensors 60 along the vertical axis 56. In certain embodiments, the agitating system may be mounted higher in the storage tank relative to the sub-hopper. For example, the agitating system may be disposed above the sub-hopper, such as within the structure of the storage tank. As the particulate material rests in the storage tank, the particulate material may clump together to form pieces that are larger than desired (e.g., larger than the openings of the inlets 49). When the particulate material flows through the agitating system 44 (e.g., while the particulate material agitating and metering system 30 is operating), rotation of the agitator breaks the clumps of particulate material into smaller pieces more suitable for flowing through the metering system 45. In additional or alternative embodiments, the agitating system 44 may be operated to adjust a profile of the particulate material in the storage tank. That is, the agitating system 44 may move particulate material (e.g., along the longitudinal axis 58) so as to change how the particulate material is distributed along the agitating system 44.

The agitator 63 includes a shaft 70 coupled to a drive system 72. The shaft 70 extends along the longitudinal axis 58 across the sub-hopper 64. Furthermore, the shaft 70 may be rotatably coupled to the sub-hopper 64 at an end 75 of the sub-hopper 64 (e.g., via a bearing positioned at the end 75). As such, the position of the shaft 70 may be substantially maintained within the sub-hopper 64. The agitator 63 includes an agitator coil 74 coupled to the shaft 70. In the illustrated embodiment, the agitator coil 74 is wrapped around the shaft 70 and is configured to enable the particulate material to flow between the shaft 70 and the agitator coil 74. Although the agitator coil 74 is wrapped in a helical form in the illustrated embodiment, in additional or alternative embodiments, the agitator coil may be wrapped in a cylindrical form, a conical form, another suitable form, or any combination thereof, around the shaft. Additionally, the agitator 63 includes fingers or protrusions 61 that extend from the shaft in the illustrated embodiment, in which movement of the fingers or protrusions induces movement of the particulate material, but the fingers may not be included in other embodiments. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, there is more than one agitator coil 74 coupled to the shaft 70 at different locations along the length of the shaft 70 in the illustrated embodiment, but in additional or alternative embodiments, there may be a single agitator coil coupled to the shaft. In the illustrated embodiment, the agitator 63 may rotate to move particulate material in the sub-hopper 64 and/or the storage tank. The agitator 63 may be driven to rotate in either direction to move the particulate material toward each longitudinal side of the sub-hopper 64. Certain embodiments of the agitating system may have more than one agitator, and multiple drives may be coupled to the respective agitators (e.g., to the shafts) to drive rotation of respective agitators, and the drives may be independently controllable so as to move the agitators independently of one another. In certain embodiments, other types of agitators may be used in the agitating system, such as agitators having only the coil, only fingers, and so forth.

The drive system 72 of the particulate material agitating and metering system 30 may be configured to drive the agitator 63 to rotate, such as via a motor (e.g., an electric motor, hydraulic motor, etc.). In the illustrated embodiment, the drive system 72 includes a single motor coupled to the sub-hopper 64. However, additional or alternative embodiments of the drive system may include more than one motor (e.g., 2, 3, 4, 5, etc.). For example, the drive system may include a motor disposed at each longitudinal end of the sub-hopper (e.g., along the longitudinal axis 58) or motor(s) disposed along the length of the sub-hopper. Motor(s) disposed along the length of the sub-hopper may be connected to the agitator(s) and may be configured to drive the agitator(s). For example, each motor may be coupled to and configured to drive a corresponding segment of the agitator, and the agitator may include alternating sections of motor and agitator segments extending along the length of the agitator. The motors may selectively drive the corresponding agitator segments to move the particulate material in one or more directions and/or to break up clumps within the particulate material. As the agitator 63 turns, the agitator 63 drives the particulate material to move within the sub-hopper 64. In alternative embodiments, a single motor may be configured to drive multiple agitators, a single motor may be configured to drive the entire agitator, and/or per-meter agitators may be driven by existing meter motors for each metering device. In further embodiments, multiple agitators may also be disposed at different levels in the sub-hopper and/or storage tank. For example, one or more agitator(s) may be disposed in the sub-hopper and one or more agitator(s) may be disposed higher in the storage tank.

As mentioned above, certain forces may be imparted onto the shaft 70, such as by the weight of the particulate material above the shaft and/or by rotation of the shaft 70 via the drive system 72. As such, the shaft 70 is secured within the sub-hopper 64 by multiple supports 76. Each support 76 rotatably couples the shaft 70 to the sub-hopper 64 and supports the shaft 70, thereby reducing flexing/bending of the shaft 70 within the sub-hopper 64. For example, several supports 76 may be disposed along a length of the shaft 70 (e.g., along the longitudinal axis 58). Because the supports 76 reduce flexing/bending of the shaft 70, a longevity of the shaft 70 may be increased and/or an effectiveness of the operation of the agitator 63 may be enhanced. Each support 76 may be made of a durable material, such as a metal (e.g., steel), a polymer (e.g., polycarbonate), or any combination thereof, to transfer the force imparted onto the support 76 (e.g., by the weight of the particulate material, by rotation of the shaft 70) to a supporting structure (e.g., to the sub-hopper 64).

In some embodiments, the particulate material agitating and metering system 30 includes a controller 80 that is communicatively coupled to the drive system 72 and the sensors 60. The controller 80 may control operation of the agitating system 44, such as controlling rotation of the agitator 63 by controlling the drive system 72. The controller 80 includes a processor 82 configured to execute software code or instructions stored on a memory 84. The term "software code" or "code" used herein refers to any instructions or set of instructions that influence the operation of the processor 82. They may exist in a computer-executable form, such as machine code, which is the set of instructions and data directly executed by the processor 82, a human-understandable form, such as source code, which may be compiled in order to be executed by the processor 82, or an intermediate form, such as object code, which is produced by a compiler. As used herein, the term "software code" or "code" also includes any human-understandable computer instructions or set of instructions, e.g., a script, that may be executed on the fly with the aid of an interpreter executed by the controller 80.

As an example, the memory 84 may store processor-executable software code or instructions (e.g., firmware or software), which are tangibly stored on a tangible computer readable medium. Additionally or alternatively, the memory 84 may store data (e.g., information regarding operation of the particulate material agitating and metering system 30). As an example, the memory 84 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors. The processor 82 and/or memory 84, and/or an additional processor and/or memory, may be located in any suitable portion of the agricultural system. For instance, a memory may be located in the drive system 72.

Figure 3:
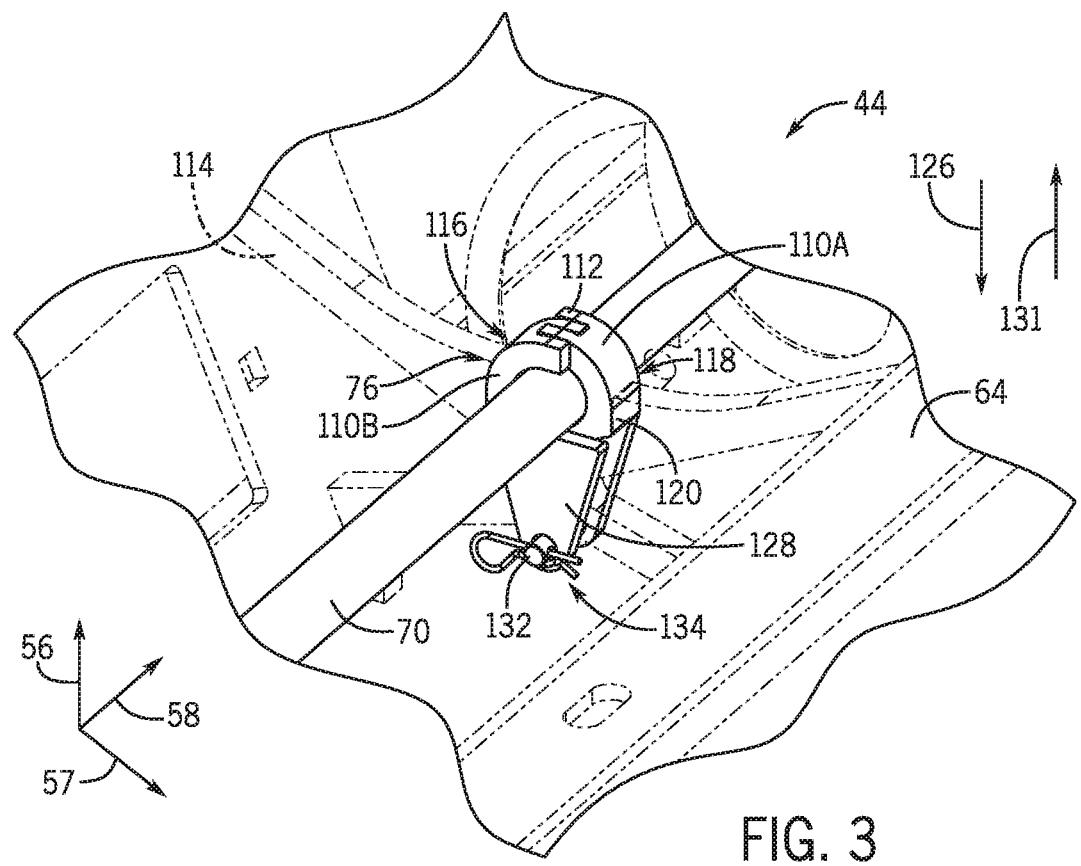
FIG. 3 is a perspective view of a portion of the agitating system of FIG. 2 having a support securing a shaft within a sub-hopper, in accordance with an aspect of the present disclosure.

FIG. 3 is a perspective view of embodiment portion of the agitating system 44 of FIG. 2, in which the support 76 secures the shaft 70 within the sub-hopper 64. The support 76 may be one of many supports 76 disposed along the shaft 70. In the illustrated embodiment, the support 76 includes two parts, a first support piece 110A and a second support piece 110B, which cooperatively engage the shaft 70 to secure the shaft 70 within the sub-hopper 64. As illustrated, each support piece 110 includes respective protrusions 112. In the illustrated installed configuration of the support 76, the respective protrusions 112 of the support pieces 110 interlock with one another, thereby securing the support pieces 110 together around the shaft 70. The support 76 couples the shaft 70 to a brace 114, which is affixed (e.g., welded) to the sub-hopper 64. As illustrated, the shaft 70 extends through a first portion (e.g., upper portion) 116 of each support piece 110, and the shaft 70 rotates within a concentric space formed by the first portion 116. The concentric space conforms to the geometry of the shaft 70, which reduces eccentric rotation, bending, vibration, other undesirable movement, or any combination thereof, of the shaft 70. Furthermore, the support 76 is secured to the brace 114. As illustrated, the support 76 is positioned within a recess 118 of the brace 114 and abuts a wall 120 of the brace 114 outlining the recess 118. As such, the wall 120 blocks movement of the support 76 relative to the brace 114 along the lateral axis 57 and along the vertical axis 56 in a first vertical direction 126 (e.g., a downward direction), thereby blocking movement of the shaft 70 relative to the brace 114 along the lateral axis 57 and along the vertical axis 56 in the first vertical direction 126. Additionally, an inner surface of a body 128 of each support piece 110 abuts the brace 114. The abutment of the inner surfaces of the bodies 128 against the brace 114 and the interlocking of the plurality of protrusions 112 blocks movement of the support 76 along the longitudinal axis 58 relative to the brace 114.

In the installed configuration of the support 76, a fastener 132 extends through respective second portions (e.g., lower portions) 134 of the support pieces 110 along the longitudinal axis 58 (e.g., parallel to the shaft 70). As used herein, the second portions 134 refer to a part of the support piece 110 that may include a hole to accommodate positioning of the fastener 132. In some embodiments, the fastener 132 holds the respective bodies 128 of the support pieces 110 against the brace 114, thereby further blocking movement of the support 76 relative to the brace 114. By way of example, the fastener 132 may abut the brace 114 in the installed configuration of the support 76 to block movement of the support 76 in a second vertical direction 131 (e.g., an upward direction) along the vertical axis 56. In certain embodiments, the fastener compresses the bodies 128 against the brace, thereby at least partially blocking movement of the support 76 relative to the brace 114 along the vertical and/or lateral axes 56, 57. The protrusions 112 blocks outward movement of the respective first portions 116 of the support pieces 110 away from one another along the longitudinal axis 58, and the fastener 132 blocks movement of the respective second portions 134 of the support pieces 110 away from one another along the longitudinal axis 58. In the illustrated embodiment, the fastener 132 includes a pin with a cotter pin extending through one end of the pin. However, in other embodiments, the fastener may include a clip, a push pin, a screw and nut, a rivet), a rod, or any combination thereof, configured to couple the support pieces 110 to one another.

Figure 4:
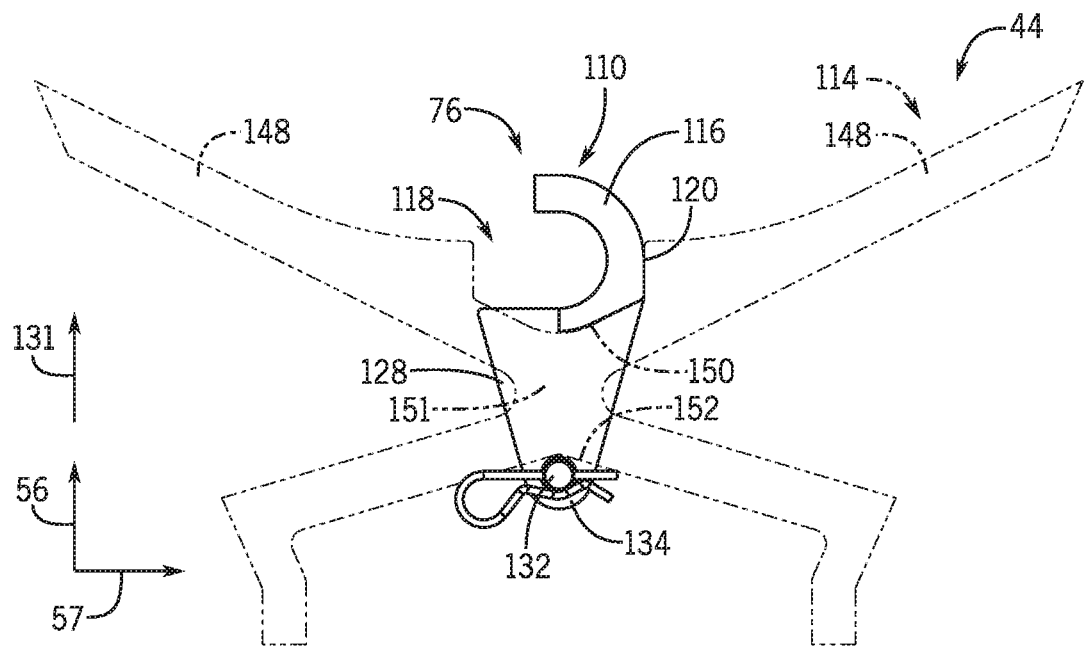
FIG. 4 is a side view of a portion of the agitating system of FIG. 2 having a support piece of a support disposed within a recess, in accordance with an aspect of the present disclosure.

FIG. 4 is a side view of a portion of the agitating system 44 of FIG. 2 having one of the support pieces 110 (e.g., the first support piece 110A) of one of the supports 76 disposed within the recess 118. In the illustrated embodiment, the two arms 148 cooperatively form the recess 118, and the two arms 148 may be configured to couple to the sub-hopper. The wall 120 outlining the recess 118 captures the first portion 116 of the first support piece 110A. As such, a geometry of the wall 120 substantially matches a geometry of the first portion 116 to effectively constrain the first support piece 110A within the recess 118 and to block movement of the first support piece 110A relative to the brace 114 (e.g., along the lateral axis 57). In addition, the first support piece 110A abuts a base structure 150 forming a bottom portion of the recess 118. In the illustrated embodiment, the base structure 150 is shaped to substantially match the shape of the first portion 116 of the first support piece 110A at the bottom of the recess 118, thereby effectively capturing the first support piece 110A within the recess 118. Thus, the base structure 150 blocks movement of the first support piece 110A relative to the brace 114, such as along the vertical axis 56.

The body 128 of the first support piece 110A extends along the vertical axis 56 across the brace 114, such that the second portion 134 of the first support piece 110A extends along the vertical axis 56 below a center section 151 of the brace 114. As such, the fastener 132 may be positioned along the vertical axis 56 below a side (e.g., an underside) 152 of the brace 114 in the installed configuration. The fastener 132, while extending through the second portion 134, abuts the side 152 to block movement of the first support piece 110A in the second vertical direction 131 along the vertical axis 56. As an example, the abutment of the fastener 132 against the brace 114 may further block movement of the support 76 along the vertical axis 56 (e.g., in the second vertical direction 131) relative to the brace 114, thereby blocking movement of the shaft 70 relative to the brace 114 along the vertical axis 56. Thus, the support 76 generally blocks movement of the shaft 70 along the lateral axis 57 and the vertical axis 56 relative to the brace 114.

Figure 5:
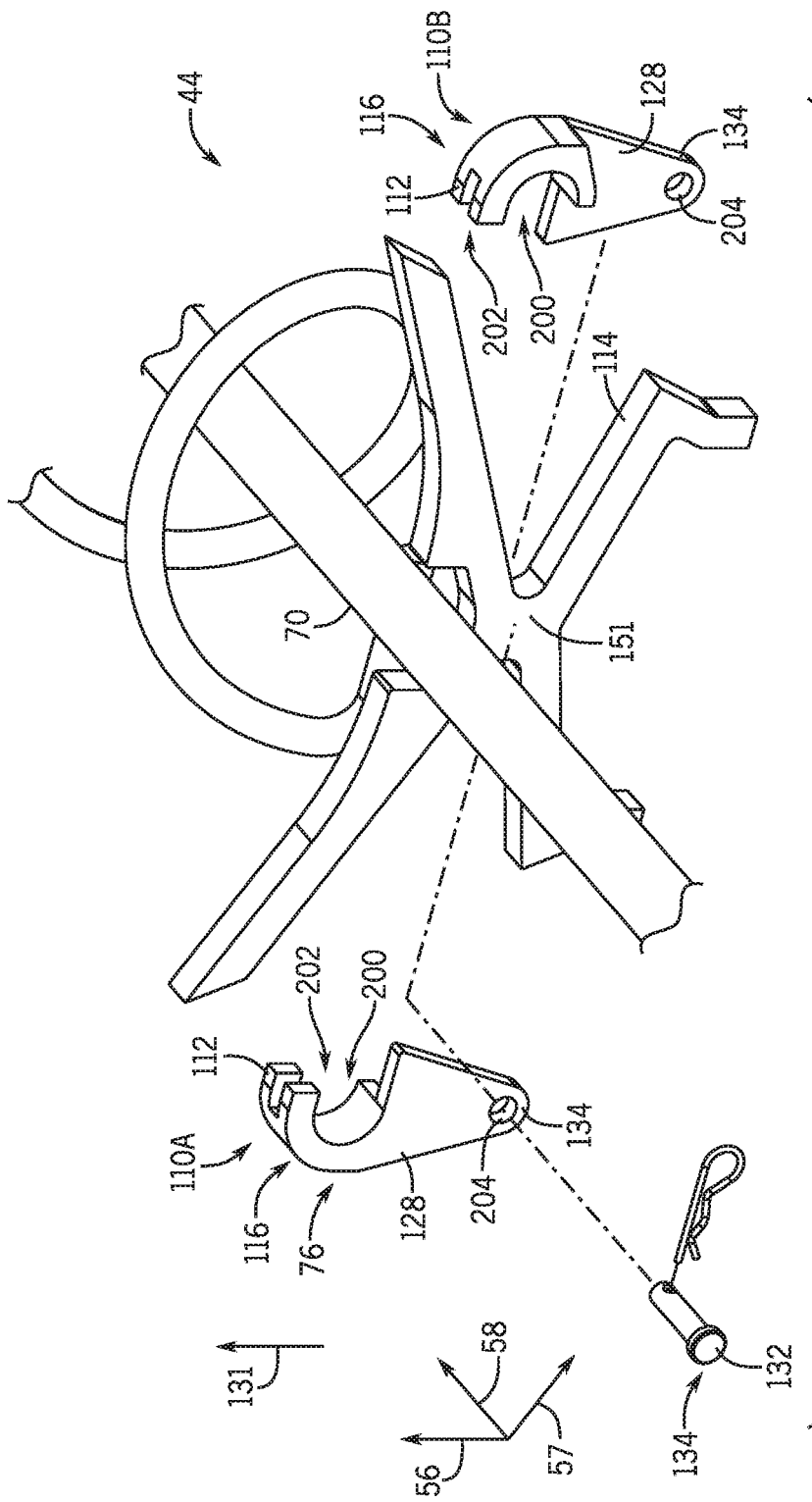
FIG. 5 is an exploded perspective view of a portion of the agitating system of FIG. 2, in accordance with an aspect of the present disclosure.

FIG. 5 is an exploded perspective view of the agitating system 44 of FIG. 3. Each protrusion 112 and first portion 116 of each support piece 110 cooperatively form a hook-like shape relative to the body 128, thereby forming a recess 200 within the first portion 116 of the support piece 110. Thus, the body 128 refers to a part of the support piece 110 below the recess 200 formed by the protrusions 112 and the first portion 116 of the support piece 110. When the support pieces 110 are engaged with one another, the corresponding recesses 200 align with one another to form an opening of the support through which the shaft 70 may extend. The size of the recesses 200 may be selected based on the cross-sectional area (e.g., diameter) of the shaft 70 extending through the support pieces 110. For example, each recess 200 may have an arcuate geometry or shape having a radius that is sized to substantially match (e.g., within 0.2 centimeters, within 0.5 centimeters, within 1 centimeter) a radius of the shaft 70, so as to enable the shaft 70 to engage the recess 200 via a slip fit. Thus, the support pieces 110 may each engage the shaft 70, and the shaft 70 may rotate within the recesses 200. Each support piece 110 further includes two protrusions 112 in the illustrated embodiment. The two protrusions 112 are positioned apart from one another to form a space 202 between the two protrusions 112. One of the protrusions 112 of the first support piece 110A may be positioned (e.g., via a slip fit) in the space 202 of the second support piece 110B, and one of the protrusions 112 of the second support piece 110B may be positioned in the space 202 of the first support piece 110A. In this way, the respective protrusions 112 of the support pieces 110 interlock with one another to couple the support pieces 110 together along the longitudinal axis 58. Additionally, the protrusions 112 (e.g., circumferential ends of the protrusions 112) contact a corresponding first portion 116 of the opposite support piece 110 to block circumferential movement of the support pieces 110. Although each support piece 110 includes two protrusions 112 in the illustrated embodiment, alternative embodiments of the support piece may include three protrusions, four protrusions, or any suitable number of protrusions and corresponding spaces, to enable the support pieces to couple to one another.

Additionally, each support piece 110 includes a hole 204 through which the fastener 132 may extend. In the installed configuration of each support piece 110, the body 128 of the support piece 110 is sized such that the second portion 134 extends past the center section 151 of the brace 114 such that the hole 204 is positioned below the underside of the brace 114 to enable the fastener 132 to enable the fastener 132 to abut the underside of the brace 114 in the installed configuration. Furthermore, the respective holes 204 of the support pieces 110 align with one another in the installed configuration of the support 76. In this way, the fastener 132 may extend through both of the holes 204.

The support pieces 110 of the support may be identical to one another. That is, the first support piece 110A may have the same geometry as the second support piece 110B. As such, a single manufacturing process may be used to produce the support pieces 110, thereby reducing a cost associated with manufacturing the support pieces 110 (e.g., as compared to manufacturing two different support pieces of each support).

Figure 6:
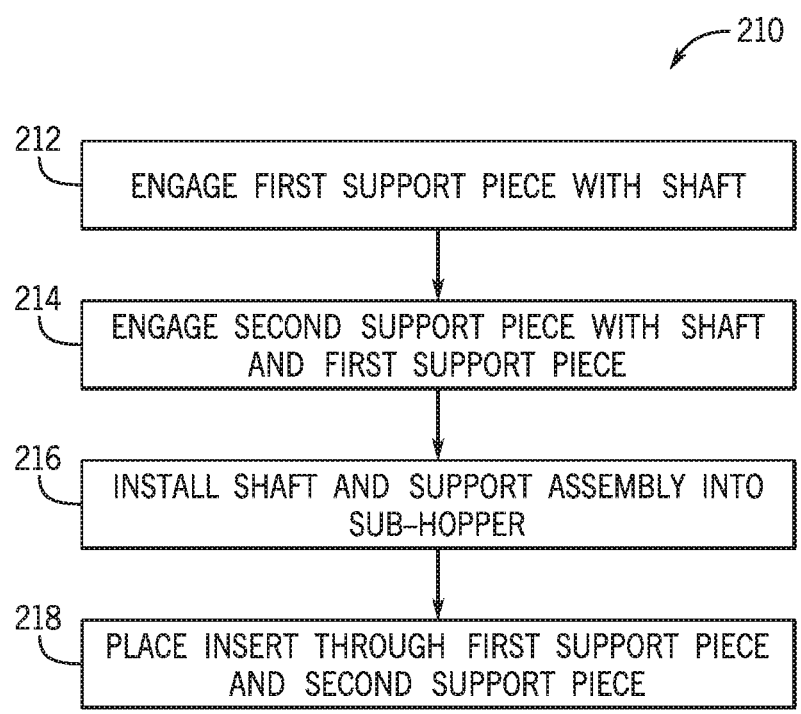
FIG. 6 is a block diagram of an embodiment of a method or process for assembling the support together onto a shaft and installing the support and shaft assembly into a sub-hopper to form an agitating system, in accordance with an aspect of the present disclosure.

FIG. 6 is a block diagram of an embodiment of a method or process 210 for assembling the support(s) onto the shaft and installing the support(s) and shaft assembly into the sub-hopper to form the agitating system. The method 210 may be performed by a user, such as during manufacturing of the particulate material agitating and metering system. It should be noted that the method 210 may be performed differently, such as for different embodiments of the particulate material agitating and metering system. For instance, additional steps may be added to the method 210. Additionally or alternatively, certain steps depicted in the method 210 may be removed, modified, or performed in a different order. In certain embodiments, the steps may be performed in the order disclosed.

At block 212, the first support piece is engaged with the shaft. By way of example, the first support piece is positioned such that the first portion of the first support piece captures a portion of the shaft. After the first support piece is engaged with the shaft, the second support piece is engaged with the shaft and with the first support piece, as shown at block 214. For example, the second support piece is positioned such that the first portion of the second support piece captures a portion of the shaft and the protrusions of the second support piece interlock with the protrusions of the first support piece. As such, the first support piece and the second support piece are assembled as one of the supports onto the shaft.

At block 216, the assembly of the shaft and the support is installed into the sub-hopper. For example, each support may be translated along a length of the shaft to align the support with a respective brace in the sub-hopper. The shaft is then positioned within the sub-hopper (e.g., moved downwardly into the sub-hopper), such that the braces are disposed between the bodies of the respective support pieces, and the support pieces are positioned within the respective recesses. When positioned within the sub-hopper, the shaft may be coupled to the drive system and to the end of the sub-hopper, thereby stabilizing the shaft within the sub-hopper.

With the shaft and support assembly positioned within the sub-hopper, the fastener may be inserted through the openings in the support pieces, as depicted at block 218. Accordingly, the fastener extends through both of the support pieces. Thus, movement of the support pieces is blocked relative to the brace, and the position of the shaft is maintained within the sub-hopper.

It should be noted that the steps of the method may be performed in a reverse order to remove the support pieces from the agitating system. That is, for example, the fastener may be removed from the support pieces, the support(s) and shaft assembly may be removed from the sub-hopper, and the support pieces may be decoupled from the shaft and from one another.

Using two support pieces that are removably coupled to one another to form each support may enable the support to be coupled to the shaft more easily as compared to using support pieces that are fixably coupled to one another or using a support made of a single, continuous part. For example, each support piece may be easily coupled to and decoupled from any section of the shaft without translating the support piece along a length of the shaft to position the support piece at a desirable section of the shaft.

Figure 7:
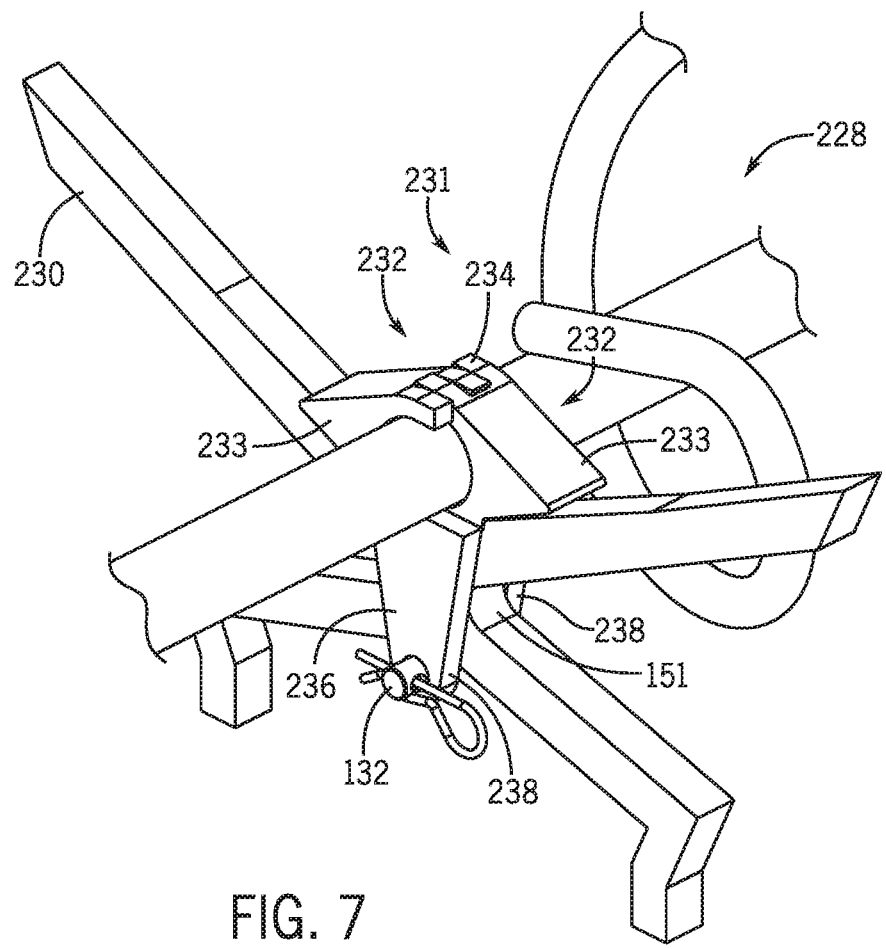
FIG. 7 is a perspective view of another embodiment of an agitating system, in accordance with an aspect of the present disclosure.

FIG. 7 is an expanded perspective view of another embodiment of an agitating system 228 having a brace 230. The illustrated agitating system 228 includes a support 231 having support pieces 232 that are shaped differently than the support pieces of the support of FIGS. 2-5. Each support piece 232 has a first portion 233, protrusions 234 of the first portion 233 that interlock with one another, a body 236 that extends to a second portion 238 having a corresponding hole through which the fastener 132 may extend. However, a first portion 233 of each support piece 232 may be differently shaped than the first portion of the support piece of the support of FIGS. 2-5. For example, each first portion 233 of each support piece 232 may be formed so as to match the geometry of the brace 230, thereby blocking movement of the support pieces 232 relative to the brace 230 in response to contact between the first portions of the support pieces and the brace. That is, the support pieces 232 are shaped to conform to the brace 230, which may be differently shaped than the brace of FIGS. 3-5. Similar to the support of FIGS. 2-5, each of the support pieces 232 may have the same slope, thereby reducing a cost associated with manufacturing the support having the support pieces 232.

Figure 8:
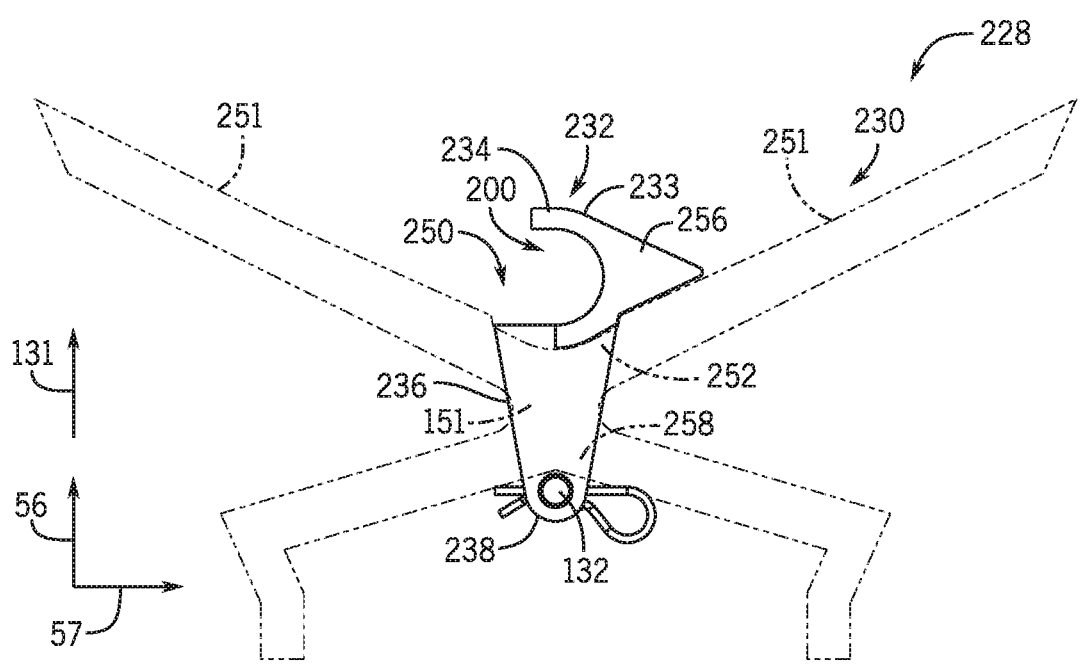
FIG. 8 is a side view of the agitating system of FIG. 7 having a support piece disposed within a recess of a brace, in accordance with an aspect of the present disclosure.

FIG. 8 is a side view of the agitating system 228 of FIG. 7 having one of the support pieces 232 disposed within a recess 250 formed between two arms 251 of the brace 230. In the illustrated embodiment, a base 252 of the recess 250 and an arm 251 of the brace 230 cooperatively capture the first portion 233 of the support piece 232. As illustrated, the first portion 232 includes a flange 256 configured to abut the arm in the installed configuration, thereby blocking movement of the support piece 232 along the lateral axis 57. Additionally, each protrusion 234 of the support piece 232 forms a hook-like shape relative to the body 236, thereby creating the recess 200 in the first portion 233 through which the shaft may extend. Further, in the installed configuration, the body 236 of the support piece 232 extends across the brace 230. Thus, the second portion 134 is clear of the center section 151 of the brace 230 and is positioned adjacent to a side 258 (e.g., an underside) of the brace 230 such that the fastener 132 abuts the side 258 when extending through the second portion 238, thereby blocking movement of the support piece 232 in the second vertical direction 131.

Additional embodiments of the support piece may be formed so as to effectively engage respective embodiments of the brace of the particulate material agitating and metering system. For example, the first portion of a support piece may have a suitable geometry that interfaces the geometry of the brace, so as to enable the brace to capture the first portion and block movement of the support piece. Furthermore, other geometric properties of each support piece, such as a thickness (e.g., along the longitudinal axis), a length (e.g., along the vertical axis), a width (e.g., along the lateral axis), may be varied based on application of the support piece. As an example, the support pieces may have a greater thickness and width for agricultural systems configured to hold a greater amount of particulate material in the storage tank, so as to enable the support pieces to support a weight of the particulate material. As another example, the support pieces may have a suitable length to position the hole of the second portion of the support piece offset from (e.g., below) the brace and proximate to the side (e.g., an underside) of the brace in the installed configuration of the support.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agitating system of an agricultural system, comprising:
   a brace configured to couple to a sub-hopper of the agricultural system; and
   a support configured to engage the brace and to support a shaft within the sub-hopper, wherein the support comprises a support piece having a first portion configured to receive the shaft, and the brace has a recess configured to receive the first portion of the support piece while the support is in an installed configuration;
   wherein the support comprises an additional support piece having an additional first portion configured to be disposed within the recess while the support is in the installed configuration, the additional first portion of the additional support piece is configured to capture the shaft, and the support piece and the additional support piece engage one another while the support is in the installed configuration.

2. The agitating system of claim 1, wherein the first portion of the support piece has a first geometry that substantially matches a second geometry of the recess, such that a wall of the brace forming a base of the recess receives the first portion of the support piece while the support is in the installed configuration.

3. The agitating system of claim 1, wherein the brace comprises two arms cooperatively forming the recess, and the two arms are configured to couple to the sub-hopper.

4. The agitating system of claim 3, wherein the support piece comprises a flange configured to abut one of the arms of the brace while the support is in the installed configuration.

5. The agitating system of claim 1, wherein the first portion forms an additional radius having an arcuate geometry having a first radius that substantially matches with a second radius of the shaft.

6. The agitating system of claim 1, wherein the support piece extends across the brace while the support is in the installed configuration such that a hole of the support piece is offset the brace.

7. A support of an agitating system of an agricultural system, comprising:
   a first support piece comprising a first portion having a first plurality of protrusions and a first recess having an arcuate shape; and
   a second support piece comprising an additional first portion that comprises a second plurality of protrusions and a second recess having an arcuate shape;
   wherein the first plurality of protrusions are configured to interlock with the second plurality of protrusions while the support is in an installed configuration, and the first recess is configured to align with the second recess while the support is in the installed configuration to form an opening configured to receive a shaft.

8. The support of claim 7, wherein the first support piece comprises a second portion having a first hole, the second support piece comprises an additional second portion having a second hole, and the first hole and the second hole are positioned to align with one another while the support is in the installed configuration.

9. The support of claim 8, comprising a fastener configured to extend through the first hole of the first support piece and the second hole of the second support piece while the support is in the installed configuration.

10. The support of claim 7, wherein the first portion of the first support piece has a first flange, and the additional first portion of the second support piece has a second flange.

11. The support of claim 7, wherein the first support piece and the second support piece have the same geometry.

12. The support of claim 7, wherein the first support piece and the second support piece are formed from a polymeric material, a metallic material, or both.

13. An agitating system of an agricultural system, comprising:
   a brace configured to couple to a sub-hopper of the agricultural system;
   a first support piece that is removably coupled to the brace and configured to support a shaft, wherein the first support piece comprises a first portion having a first plurality of protrusions, and the first portion is configured to engage the brace and the shaft while the first support piece is in an installed configuration; and
   a second support piece that is removably coupled to the brace and configured to support the shaft, wherein the second support piece comprises an additional first portion having a second plurality of protrusions, and the additional first portion is configured to engage the brace and the shaft while the second support piece is in the installed configuration, such that the first plurality of protrusions interlock with the second plurality of protrusions to couple the first support piece and the second support piece to one another.

14. The agitating system of claim 13, wherein the first portion of the first support piece forms a first recess, the additional first portion of the second support piece forms a second recess, and the first recess and the second recess are configured to align with one another in the installed configuration.

15. The agitating system of claim 13, wherein the brace comprises a recess, and a respective geometry of the first portion of the first support piece and of the additional first portion of the second support piece matches with a geometry of the recess of the brace, such that the recess captures the first portion of the first support piece and the additional first portion of the second support piece while the first support piece and the second support piece are in the installed configuration.

16. The agitating system of claim 13, wherein the first support piece comprises a first body configured to extend across the brace while the first support piece is in the installed configuration such that a first hole of the first support piece is offset the brace, the second support piece comprises a second body configured to extend across the brace while the second support piece is in the installed configuration such that a second hole of the second support piece is offset the brace, and the first hole and the second hole align with one another while the first support piece and the second support piece are in the installed configuration.

17. The agitating system of claim 16, comprising a fastener configured to extend through the first hole and the second hole while the first support piece and the second support piece are in the installed configuration, such that the fastener abuts an underside of the brace and extends along a longitudinal axis of the agitating system.

18. The agitating system of claim 13, wherein the brace comprises two arms cooperatively forming a recess, the first portion of the first support piece is configured to be disposed in the recess while the first support piece is in the installed configuration, and the additional first portion of the second support piece is configured to be disposed in the recess while the second support piece is in the installed configuration.

19. The agitating system of claim 18, wherein the first portion of the first support piece and the additional first portion of the second support piece each comprise a respective flange configured to abut the respective arms of the brace while the first support piece and the second support piece are in the installed configuration.

* * * * *